United States Patent [19]

Tashiro et al.

[11] Patent Number: 4,855,157
[45] Date of Patent: Aug. 8, 1989

[54] PROCESS FOR PRODUCING FAT POWDER

[75] Inventors: Yoichi Tashiro; Hideki Baba, both of Sennan; Kohei Obatake, Kawachinagano; Hiroshi Sakka; Ichiro Sohara, both of Hirakata, all of Japan

[73] Assignee: Fuji Oil Company, Limited, Osaka, Japan

[21] Appl. No.: 148,348

[22] Filed: Jan. 25, 1988

[30] Foreign Application Priority Data

Jan. 29, 1987 [JP] Japan .................................. 62-20159

[51] Int. Cl.⁴ ............................................... A23D 5/00
[52] U.S. Cl. ...................................... 426/609; 426/96; 426/417; 426/443; 426/580; 426/613; 426/631

[58] Field of Search ................. 426/609, 98, 607, 613, 426/417, 96, 443, 583, 584, 585, 588, 631, 656, 658, 580

[56] References Cited

U.S. PATENT DOCUMENTS 3,892,880  7/1975  Grolitsch ........................... 426/609

*Primary Examiner*—Donald E. Czaja
*Assistant Examiner*—Celine T. Callahan
*Attorney, Agent, or Firm*—Wenderoth, Lind & Ponack

[57] ABSTRACT

A process for producing fat powder which comprises contacting a fat or oil in the form of liquid drops in an atomized state with air flow at a low temperature, the fat or oil containing a non-oil soluble natural solid material uniformly dispersed therein.

6 Claims, No Drawings

PROCESS FOR PRODUCING FAT POWDER

FIELD OF THE INVENTION

The present invention relates to a process for producing free-flowing, stable fat powder.

BACKGROUND OF THE INVENTION

Nowadays, as processes for producing fat powder, in general, two processes are known, that is, a process for producing fat powder comprising spray-drying a fat or oil which has been emulsified into an oil-in-water type emulsion with water, an emulsifying agent and a hydrophilic base (spray-drying method); and a process for producing fat powder comprising atomizing a molten fat or oil in the atmosphere at a temperature which is lower than the melting point of the fat or oil (spray-cooling method). Among them, by the spray-drying method, stable, free-flowing fat powder can be obtained regardless of the melting point or S.F.I. (Solid Fat Index) of the fat or oil used because the surface of the fat or oil is coated with the hydrophilic base. However, there are many problems such as energy cost for evaporating water, deterioration of flavor of the fat at high temperature, and loss of volatile flavor by volatilization. To the contrary, in the spray-cooling method, although such problems as the above energy cost and deterioration of the flavor are not present, there is a marked disadvantage in that it is difficult to powder a fat or oil having a low S.F.I. and, even if it is powdered, the resulting powder has a low fluidity since the fat or oil containing unsaturated fatty acids segregates on the surface of the powder to make it adhesive. Due to this marked difference in fluidity, fat powder obtained by the spray-drying method has been predominantly and widely used in the fields such as various mixes for bread, cakes and cookies, instant milk powder, soup powder, fodder powder and the like.

However, recently the consumers' have demanded products of a higher grade and genuine taste, thus, the excellent flavor peculiar to fat powder obtained by the spray-cooling method has been reevaluated. Nevertheless, the improvement of the fluidity of products obtained by the spray-cooling method is strongly needed.

Heretofore, as a process for improving fluidity of fat powder, 10 to 50% by weight of wheat flour, starch and sugar have been added to the powder. Further, in Japanese Pat. Kokoku No. 50-14650 entitled "Process for Producing Fat Powder", there is disclosed a process of melting a starting fat or oil material at a temperature of at highest 15° C. higher than the melting point thereof; cooling it to a temperature of the range between the solidifying point and the melting point of the fat or oil and lower than one third from the bottom of the range; forming a stable b-type crystal nucleus completely by maintaining it at this temperature for 2 to 30 minutes; and then heating to a temperature of at highest 10% higher than the melting point (1st crystalization step); and followed by spraying it into a crystalization chamber maintained at $-15°$ C. to $-30°$ C.; aging the powder obtained at 0° C. to 10° C. for 0.5 to 10 minutes successively in an aging chamber (2nd crystalization step); and mixing the powder with powder of non-oil soluble natural solid material. However, in order to practice this process, an extremely complicated adjustment of the starting liquid material and strict control of the temperature are required and, therefore, many difficulties in operation must be overcome, if it is to be produced on an industrial basis.

OBJECTS OF THE INVENTION

The main object of the present invention is to provide fat powder having good free-flowing properties and excellent quality which can obtained by a relatively simple and energy-saving process.

This object as well as other objects and advantages of the present invention will become apparent to those skilled in the art from the following description.

SUMMARY OF THE INVENTION

According to the present invention, there is provided a process for producing fat powder which comprises contacting a fat or oil in the form of liquid drops in an atomized state with air flow at a low temperature, said fat or oil containing a non-oil soluble natural solid material uniformly dispersed therein.

DETAILED DESCRIPTION OF THE INVENTION

The fat or oil used in the present invention is an edible fat or oil having a melting point of 10° to 50° C. Examples of the fat or oil include vegetable fats and oils such as rape oil, soybean oil, cotton seed oil, safflower oil, sunflower oil, corn oil, sesame oil, peanut oil, palm oil, rice bran oil, coconut oil, cacao butter, shea fat, sal fat, mango kerner oil and illippe oil; animal fats and oils such as lard, beef tallow, chicken oil, milk fat and fish oil; processed fats and oils such as hydrogenated or interesterified fats and oils thereof and fractionated fats and oils, e.g., winterlized, solvent fractionated, and dry fractionated fats and oils thereof; and mixtured these fats and oils.

In the present invention, the fat or oil and, if necessary, an emulsifying agent (e.g. polyglycerol fatty acid ester, sorbitan fatty acid ester, polyoxyethylene sorbitan fatty acid ester, lecithin, glycerin fatty acid ester), a flavor (e.g., vanilla, vanillin, coffee, fruit flavor) and the like are melted by heating in a heating tank to completely melt the crystals of the fat or oil, and then a non-oil soluble natural solid material is uniformly dispersed therein to obtain a starting mixture. The non-oil soluble natural solid used material in the present invention include wheat flour, soybean powder, corn flour, rice flour, sugars, starch, dextrin, gums, protein, skim milk powder, whole milk powder, whey powder, casein, sodium caseinate, cacao mass, cacao powder, pepper, seasonings and the like. The amount of the natural solid material varies depending upon particular kinds thereof and the fat or oil but, usually, it is 25 to 99% by weight based on the weight of the fat or oil used.

The temperature of the starting mixture varies depending upon the raw material used, but it is generally more than the melting point of the fat or oil and ranges from 20° C. to 100° C. where the non-oil soluble natural solid material is not decomposed or deteriorated. Preferably, it is 40° C. to 70° C. Since the viscosity and physical properties of the starting mixture naturally vary according to the particular kinds and amounts of the fat or oil and the non-oil soluble natural solid material used, it is preferred to use a plunger pump or another pump for a high viscosity liquid.

The starting mixture is sprayed into a cylindrical space in a conventional spray-drying step. Particularly, the mixture is sprayed from the upper part of the space toward the lower part thereof, and, preferably, cold air is blown towards the direction at right angle to the sprayed direction. In this case, the temperature of cold air is lower than 10° C., and, lower than 0° C. is particularly preferred.

As a method atomizing the molten material (starting material) an atomizer method wherein the material is dropped on a high-speed rotating disc and atomized by centrifugal force is not suitable as a starting mixture having a high viscosity. It is rather advantageous to employ a direct method using a pressure nozzle wherein the mixture is sprayed from an orifice under high pressure or a linary fluid nozzle wherein the mixture is atomized with air or nitrogen gas.

In the case of using the pressure nozzle, it is possible to change a particle size of a product freely from granular state to a finely divided state by changing the pressure to be applied in the range of 5 to 150 kg/cm$^2$. And, in the case of using the binary fluid nozzle, it is also possible to obtain fat powder having any desired particle size under the conditions of supply pressure of 0.1 to 20 kg/cm$^2$ and air or nitrogen gas flow rate of 0.3 to 1,000 m$^3$/h.

The process for producing fat powder according to the present invention is simple as a conventional spray-drying method. And further, the fat powder produced has a taste and appearance which are not present in a conventional product and is useful for toppings such as ices, dessert, cakes, and bread; chocolate powder for kneading into a product, fat powder for soup; shortening powder for bread and cake mix; and the like.

The formation of the fat according to the present invention can be divided into two steps, that is, a crystal nuclei formation step and a crystal nuclei growing step. Liquid drops of the starting mixture which have contacted with the cold air crystalizes more rapidly by utilizing the non-oil soluble natural solid material dispersed in the mixture as crystal nuclei in comparison with that only the fat is present. As the result, single crystal size of the fat becomes finer. In addition, a solid solution wherein saturated fatty acid fat and unsaturated fatty acid fat are uniformly mixed is formed by rapid volume constriction resulting from a change from the molten state to the solid state for the purpose of preventing the unsaturated fatty acid fat from oozing to the surface of the fat particles. As the result, a good free-flowing fat powder is obtained.

The following Examples and Comparative Examples further illustrate the prevent invention in detail but are not to be construed as limiting the scope thereof.

The apparatus used herein has a spraying nozzle provided at the upper part of a cylindrical body wherein the lower part is in the shape of inverted cone, a product outlet provided at the lower end of the body, a cold air outlet and a cold air inlet provided in sequence from the upper to the lower parts of the body. Slightly warmed cold air flow, aspirated from the cold air inlet, is passed through a conduit having a bag filter and a blower at a middle part thereof, and cooled by a heat exchanger through which cooling medium from a freezer is passed. Then, the cold air flow is blown up from the cold air outlet through the conduit. The cold air flow cools and solidifies a liquid drops of the molten raw material which is passed through a conduit having a pump at the middle part thereof from a container, and conduit is atomized from the nozzle. Solidified powdered or granulated fat is collected in a container throuogh the product outlet at the lower end of the body.

EXAMPLE 1

| (Formulation) | |
|---|---|
| Ingredients | Parts by weight |
| Cacao mass | 15 |
| Whole milk powder | 18 |
| Powdered sugar | 35 |
| Cacao butter substitute (m.p. 34° C.) | 32 |
| Lecithin | 0.4 |
| Flavor | 0.02 |
| Viscosity of the mixture (BM type No. 4 rotor, 12 rpm) | 50 p/45° C. |

According to the above formulation, the desired fat powder in the form of granulated chocolate having a high melting point was produced by melting the ingredients at a temperature of 50° C. uniformly, spraying the melt from a nozzle of 1.98 mm in diameter into a cylindrical space maintained at −20° C. under such conditions that the starting mixture was at a temperature of 50° C. and the supply pressure was 25 kg/cm$^3$. The granulated chocolate product thus obtained had good free-flowing properties. After storage at 10° C. and 25° C. for 3 months, the product maintained its good fluidity and gloss.

EXAMPLE 2

| (Formulation) | |
|---|---|
| Ingredients | Parts by weight |
| Cacao powder | 8 |
| Powdered sugar | 25 |
| Coconut oil | 35 |
| Soybean oil | 25 |
| Palm soft oil | 7 |
| Lecithin | 0.5 |
| Flavor | 0.03 |
| Viscosity of the mixture (BM type No. 2 rotor, 30 rpm) | 180 cp/40° C. |

According to the above formulation, the desired fat powder in the form of granulated chocolate having a low melting point was produced by melting the ingredients at a temperature of 50° C. uniformly in the same manner as described in Example 1, spraying from a nozzle of 1.98 mm in diameter into the cylindrical space maintained at −25° C. under such conditions that the starting mixture temperature was 70° C. and the supply pressure was 80 kg/cm$^2$. The product obtained had good free-flow properties. After storage at 10° C. for 3 months, the product maintained good fluidity and gloss.

Comparative Example 1

The same raw materials as described in Example 1 was sprayed from the nozzle of 1.98 mm in diameter into a cylindrical space maintained at 20° C. under such conditions that the starting mixture temperature was 60° C. and the supply pressure was 25 kg/cm$^2$ to form a granulated chocolate product. This product somewhat melts less readily in the mouth and lacks fluidity. It was stored at 10° C. and 25° C., to test the stability. As a result, the product lost gloss within a week.

EXAMPLE 3

| (Formulation) | |
|---|---|
| Ingredients | Parts by weight |
| Soybean hydrogenated oil (m.p. 46° C.) | 75 |
| Skim milk powder | 25 |

According to this formulation, the desired fat powder for soup was produced by melting 75 parts by weight of soybean hydrogenated oil having the melting point of 46° C. and adding thereto 25 parts of skim milk powder to form a uniform dispersion. The dispersion obtained was sprayed from a binary fluid nozzole into the cylindrical space maintained at −25° C. under such conditions that the starting mixture temperature was 60° C., supply pressure was 1.2 kg/cm$^2$ and the air flow rate was 350 m$^3$/h. The product had good free-flow properties. After storage at 25° C. for 3 months, no caking was observed and the product had a good taste and flavor.

EXAMPLE 4

| (Formulation) | |
|---|---|
| Ingredients | Parts by weight |
| Hydrogenated soybean oil (m.p. 42° C.) | 40 |
| Lecithin | 2 |
| Whey powder | 28 |
| Skim milk powder | 30 |

According to the above formulation, the desired fat powder for fodder powder was produced by melting 40 parts by weight of hydrogenated soybean oil having a melting point of 42° C. and adding thereto 2 parts of lecithin and 30 parts of skim milk powder to obtain a uniform dispersion. The dispersion obtained was sprayed from a binary fluid nozzle into a cylindrical space maintained at −10° C. under such conditions the starting mixture temperature of 55° C., supply pressure was 10.0 kg/cm$^2$ and the air flow rate was 600 m$^3$/h. The product had good free-flow properties. After storage at 25° C. for 3 months, the powder maintained good physical properties.

COMPARATIVE EXAMPLE 2

A process was carried out in the same manner as described in Example 4 except that only 40 parts by weight of hydrogenated soybean oil (m.p. 42° C.) and 2 parts of lecithin were melted and mixed. The mixture was sprayed from a binary fluid nozzle into a cylindrical space maintained at −10° C. under the conditions that the starting mixture temperature was 55° C., the supply pressure was 10.0 kg/cm$^2$ and the air flow rate was 600 m$^3$/h to form a free-flowing fat powder. 28 Parts of whey powder and 30 parts of skim milk powder were quickly added to 42 parts of the above-obtained fat powder. After storage at 25° C. for 3 months, the powder lost fluidity after one day and was not suitable for using as a fodder.

The results of above mentioned Examples and Comparative Examples are shown in Table 1 or Table 2.

TABLE 1

| | Storage stability of chocolate powder (after 3 months) | | | | | |
|---|---|---|---|---|---|---|
| Physical Property | fluidity | | state of granule | | gloss | |
| Temperature (°C.) | 10 | 25 | 10 | 25 | 10 | 25 |
| Example 1 | A | A | A | A | A | A |
| Example 2 | A | A | A | A | A | A |
| Comparative Example 1 | B | B | B–C | B–C | B | B |

TABLE 2

| | Change of fluidity at 25° C. | | | |
|---|---|---|---|---|
| Storage period | 0 day | 1 days | 7 days | 3 months |
| Example 3 | B–A | A | A | A |
| Example 4 | B–A | A | A | A |
| Comparative Example 2 | B–A | C | C | C |

The symbols used in Tables 1 and 2 represent as follows.
Fluidity
A: good free-flowing
B: less free-flowing
C: non free-flowing
State of granule
A: spherical
B: flat shaped
C: indefinite mass
Gloss
A: glossy
B: Slightly dull
C: dull

What is claimed is:

1. A process for producing edible fat powder which consists essentially of contacting an edible fat or oil in the form of liquid drops in an atomized state with air flow at a temperature lower than 10° C., thereby cooling and solidifying the fat or oil, said fat or oil containing an edible non-oil soluble natural solid material uniformly dispersed therein, said non-oil soluble natural solid material being at least one member selected from the group consisting of sugars, starch, dextrin, gums, protein, whole milk powder, whey powder, cacao mass and cacao powder.

2. A process according to claim 1, wherein the melting point of the fat or oil is in the range of 10° C. to 50° C.

3. A process according to claim 1, wherein the atomized state is obtained by spraying the fat or oil from a nozzle in a cylindrical space.

4. A process according to claim 1, wherein the fat powder produced is chocolate powder.

5. A process according to claim 1 wherein the edible fat or oil and non-oil soluble material also contains an edible emulsifier and an edible flavor.

6. A process according to claim 1 wherein said fat or oil is molten.

* * * * *